United States Patent [19]
Vanderlaan et al.

[11] Patent Number: 6,020,445
[45] Date of Patent: *Feb. 1, 2000

[54] SILICONE HYDROGEL POLYMERS

[75] Inventors: Douglas G. Vanderlaan; Ivan M. Nunez; Marcie Hargiss, all of Jacksonville, Fla.

[73] Assignee: Johnson & Johnson Vision Products, Inc., Jacksonville, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/948,128

[22] Filed: Oct. 9, 1997

[51] Int. Cl.[7] .................................................... C08F 30/08
[52] U.S. Cl. ............................................ 526/279; 526/212
[58] Field of Search ..................................... 526/279, 212

[56] References Cited

U.S. PATENT DOCUMENTS

| | | |
|---|---|---|
| Re. 27,401 | 6/1972 | Wichterle et al. . |
| 3,361,858 | 1/1968 | Wichterle . |
| 3,408,429 | 10/1968 | Wichterle . |
| 3,496,254 | 2/1970 | Wichterle . |
| 3,660,545 | 5/1972 | Wichterle . |
| 3,699,089 | 10/1972 | Wichterle . |
| 4,113,224 | 9/1978 | Clark et al. . |
| 4,136,250 | 1/1979 | Mueller et al. . |
| 4,153,641 | 5/1979 | Deichert et al. . |
| 4,197,266 | 4/1980 | Clark et al. . |
| 4,208,364 | 6/1980 | Shepherd . |
| 4,347,198 | 8/1982 | Ohkada et al. . |
| 4,495,313 | 1/1985 | Larsen . |
| 4,555,372 | 11/1985 | Kunzler et al. . |
| 4,565,348 | 1/1986 | Larsen . |
| 4,568,501 | 2/1986 | Wichterle . |
| 4,680,336 | 7/1987 | Larsen et al. . |
| 4,740,533 | 4/1988 | Su et al. . |
| 4,886,862 | 12/1989 | Kuwamura et al. ............... 526/279 |
| 4,889,664 | 12/1989 | Kindt-Larsen et al. . |
| 4,910,277 | 3/1990 | Bambury et al. . |
| 4,954,587 | 9/1990 | Mueller . |
| 5,010,141 | 4/1991 | Mueller . |
| 5,034,461 | 7/1991 | Lai et al. . |
| 5,072,215 | 12/1991 | Brotz . |
| 5,077,335 | 12/1991 | Schwabe et al. . |
| 5,079,319 | 1/1992 | Mueller . |
| 5,115,056 | 5/1992 | Mueller et al. . |
| 5,260,000 | 11/1993 | Lai . |
| 5,336,797 | 8/1994 | McGee . |
| 5,352,714 | 10/1994 | Lai . |
| 5,358,995 | 10/1994 | Lai . |
| 5,387,632 | 2/1995 | Lai . |
| 5,451,617 | 9/1995 | Lai . |
| 5,486,579 | 1/1996 | Lai . |

FOREIGN PATENT DOCUMENTS

| | | |
|---|---|---|
| 0 493 320 A2 | 12/1991 | European Pat. Off. . |
| 58-79003 | 5/1983 | Japan ................................ 526/279 |
| WO 91/04288 A1 | 4/1991 | WIPO ............................. C08J 7/02 |

*Primary Examiner*—Bernard Lipman
*Assistant Examiner*—N. Sarofim
*Attorney, Agent, or Firm*—Anne B. Kiernan

[57] ABSTRACT

This invention relates to polymers that are formed by polymerizing a reaction mixture that comprises at least one silicone-containing monomer and at least one hydrophilic monomer. More particularly, this invention relates to polymers formed by polymerizing a reaction mixture that comprises at least one silicone-containing monomer and at least one hydrophilic monomer in the presence of a diluent.

25 Claims, No Drawings

SILICONE HYDROGEL POLYMERS

FIELD OF THE INVENTION

This invention relates to polymers that are formed by polymerizing a reaction mixture that comprises at least one silicone-containing monomer and at least one hydrophilic monomer. More particularly, this invention relates to polymers formed by polymerizing a reaction mixture that comprises at least one silicone-containing monomer and at least one hydrophilic monomer in the presence of a diluent.

BACKGROUND OF THE INVENTION

A hydrogel is a hydrated cross-linked polymeric system that contains water in an equilibrium state. Hydrogels typically are oxygen permeable and biocompatible, making them a preferred material for producing biomedical devices and in particular contact or intraocular lenses.

Conventional hydrogels are prepared from monomeric mixtures predominantly containing hydrophilic monomers, such as, 2-hydroxyethyl methacrylate or N-vinyl pyrrolidone. U.S. Pat. Nos. 4,495,313; 4,889,664 and 5,039,459 disclose the formation of conventional hydrogels. Displaceable diluents are often used to form conventional hydrogels, such as water-displaceable boric acid esters of polyhydric alcohols. In U.S. Pat. No. 4,680,336, the displaceable diluents disclosed are water-displaceable organic compounds selected on the basis of their viscosity and their Hansen cohesion parameters relative to the cohesion parameters of the polymeric component of the hydrogel to be prepared. Oxygen permeability of these conventional hydrogel materials relates to the water content of the materials, and is typically below 20–30 barrers. For contact lenses made of the conventional hydrogel materials, that level of oxygen permeability is suitable for short-term wear of the contact lenses; however, that level of oxygen permeability may be insufficient to maintain a healthy cornea during long-term wear of contact lenses (e.g. 30 days without removal). Therefore, efforts have been made and continue to be made to increase the oxygen permeability of conventional hydrogels.

One known way to increase the oxygen permeability of the hydrogels is to add silicone-containing monomers to the hydrogel formulations, thereby making silicone hydrogels. Silicone-containing polymers generally have higher oxygen permeabilities than conventional hydrogels. Silicone hydrogels have been prepared by polymerizing mixtures containing at least one silicone-containing monomer and at least one hydrophilic monomer. Either the silicone-containing monomer or the hydrophilic monomer may function as a crosslinking agent (a crosslinking agent is a monomer having multiple polymerizable functionalities) or a separate crosslinking agent may be employed. The formation of silicone hydrogels has been disclosed in U.S. Pat. Nos. 4,954,587; 5,010,141; 5,079,319; 5,115,056; 5,260,000; 5,336,797; 5,358,995; 5,387,632; 5,451,617; and 5,486,579; and WO 96/31792. In these references, n-hexanol, ethanol, and n-nonanol are used as diluents to compatibilize the silicone monomers and the hydrophilic monomers. Additional broad classes of materials are disclosed in those patents as potentially useful as diluents. The diluents used in the prior art were used in relatively large amounts of the total weight of the reaction mixture. A large amount of the diluent makes it difficult to mold the silicone hydrogel lenses reproducibly, because a large amount of the diluent leads to a large amount of diluent evaporating during the process. Further, the use of such a large amount of diluent may be a fire hazard, and often leads to polymeric materials with reduced toughness. If molding, the use of a large amount of diluent may also make it necessary to mold the polymer in a larger sized mold to compensate for the shrinkage caused by the removal of the diluent after polymerization. More importantly, the diluents used in the prior art inadequately solubilize many blends of silicone monomers and macromers and hydrophilic monomers, especially blends with relatively high levels of hydrophilic monomers. These blends and resulting polymers are opaque and not useful for contact lenses.

An alternative approach to forming silicone-hydrogels which avoids the addition of diluents is disclosed in U.S. Pat. Nos. 5,321,108, 5,387,662 and 5,539,016. These patents describe the use of polysiloxanes with a polar fluorinated graft or side group having a hydrogen atom attached to a terminal difluoro-substituted carbon atom. While this does improve compatibility for certain combinations of silicone and hydrophilic monomers, it requires multiple step synthesis of complex silicone macromers.

There still remains a need in the art for silicone hydrogels which are polymerized in an economic and efficient way.

SUMMARY OF THE INVENTION

This invention provides a polymer prepared by polymerizing a reaction mixture comprising one or more silicone-containing monomers, one or more hydrophilic monomers, and a diluent comprising the following structure:

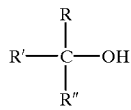

where R, R' and R" are independently selected from H, a linear, branched or cyclic monovalent alkyl having 1 to 10 carbons which may optionally be substituted with one or more groups including halogens, ethers, esters, aryls, aminos, amides, alkenes, alkynes, carboxylic acids, alcohols, aldehydes, ketones or the like, with the proviso that no more than one of R, R', R" or R''' is H. Alternatively, any two or all three of R, R' and R" can together bond to form one or more cyclic structures, such as alkyl having 1 to 10 carbons which may also be substituted as just described, with the proviso that no more than one of R, R' or R" is H.

The advantages of this invention are that the disclosed diluents are much more effective in solubilizing combinations of silicone-containing monomers and hydrophilic monomers than the diluents disclosed in the prior art. The use of the disclosed diluents provide clear blends and polymers using combinations of a wide range of silicone-containing monomers and hydrophilic monomers. For some combinations of silicone-containing monomers and hydrophilic monomers, the amount of diluent required to produce a clear blend and polymer was less than half of the amount of the prior art diluent. The polymers produced according to this invention can be used to produce contact lenses which will provide high oxygen permeability, and good mechanical properties and can be produced economically and efficiently. The polymer of this invention can be used to make biomedical devices which require biocompatability and high oxygen permeability.

DETAILED DESCRIPTION OF THE INVENTION

Typically after polymerization of the reaction mixture (which is defined as the silicone-containing and hydrophilic monomers, diluents and any other optional ingredients such as crosslinking agents, catalysts, release agents, tints etc. which are blended together prior to polymerization), the resulting polymer is treated with a solvent to remove the diluent and ultimately replace the diluent with water. The solvent used to remove the diluent may be water (or an aqueous solution such as physiological saline), or depending on the solubility characteristics of the diluent used in the process of the invention and the solubility characteristics of any residual unpolymerized monomers, the solvent initially used to replace the diluent can be an organic liquid such as ethanol, methanol, isopropanol, mixtures thereof, or the like, or a mixture of one or more such organic liquids with water, followed by extraction with pure water (or physiological saline) to produce a silicone hydrogel comprising a polymer of said monomers swollen with water. The silicone hydrogels after hydration of the polymers preferably comprise 2 to 50 weight percent water, more preferably 10 to 40 weight percent water, and most preferably 15 to 35 weight percent water of the total weight of the silicone hydrogel. These silicone hydrogels are particularly suited for making contact lenses or interocular lenses, preferably contact lenses.

Various processes are known for curing the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The preferred method for producing contact lenses comprising the polymer of this invention is by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to thereby produce a polymer/diluent mixture in the shape of the final desired product. Then, this polymer/diluent mixture is treated with a solvent to remove the diluent and ultimately replace it with water, producing a silicone hydrogel having a final size and shape which are quite similar to the size and shape of the original molded polymer/diluent article. This method can be used to form contact lenses and is further described in U.S. Pat. Nos. 4,495,313; 4,680,336; 4,889,664; and 5,039,459, incorporated herein by reference.

To make the polymer of this invention diluents are used, which have the following structure:

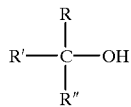

where R, R' and R" are independently selected from H, a linear, branched or cyclic monovalent alkyl having 1 to 10 carbons which may optionally be substituted with one or more groups including halogens, ethers, esters, aryls, aminos, amides, alkenes, alkynes, carboxylic acids, alcohols, aldehydes, ketones or the like, or any two or all three of R, R' and R" can together bond to form one or more cyclic structures, such as alkyl having 1 to 10 carbons which may also be substituted as just described, with the proviso that no more than one of R, R' or R" is H.

It is preferred that R, R' and R" are independently selected from H or unsubstituted linear, branched or cyclic alkyl groups having 1 to 7 carbons. It is more preferred that R, R', and R" are independently selected from unsubstituted linear, branched or cyclic alkyl groups having 1 to 7 carbons. For commercial purposes, the preferred structure of the diluent has 4 or more, more preferably 5 or more, most preferably 6 or more total carbons, because the higher molecular weight diluents have lower volatility, and lower flamability. When one of R, R' and R" is H, the structure forms a secondary alcohol. When none of R, R" and R" are H, the structure forms a tertiary alcohol. Tertiary alcohols are more preferred than secondary alcohols, because it is believed that they do not tend to participate in chain transfer reactions that can interfere with polymerization. The diluents are preferably inert and easily displaceable.

Examples of useful secondary alcohols include 2-butanol, 2-propanol, menthol, cyclohexanol, cyclopentanol and exo-norborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, menthol, and the like.

Examples of useful tertiary alcohols include tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3 octanol, 3-ethyl-3-hexanol, 3-ethyl-3-heptanol, 4-ethyl-4-heptanol, 4-propyl-4-heptanol, 4-isopropyl-4-heptanot, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3, 4-trimethyl-3-pentanol, 3,7-dimethyl-3-octanol, 2-phenyl-2-butanol, 2-methyl-1-phenyl-2-propanol and 3-ethyl-3-pentanol, and the like.

A single alcohol or mixtures of two or more of the above-listed alcohols or two or more alcohols according to the structure above can be used as the diluent to make the polymer of this invention.

The preferred diluents are secondary and tertiary alcohols having more than 4 carbons. The more preferred diluents include tert-butanol, tert-amyl alcohol, 2-butanol, 2-methyl-2-pentanol, 2,3-dimethyl-2-butanol, 3-methyl-3-pentanol, 3-ethyl-3-pentanol, 3,7-dimethyl-3-octanol.

Presently, the most preferred diluents are tert-butanol, 3-methyl-3-pentanol and 3,7-dimethyl-3-octanol.

The one or more silicone-containing monomers and one or more hydrophilic monomers used to make the polymer of this invention can be any of the known monomers used in the prior art to make silicone hydrogels. These terms silicone-containing monomers and hydrophilic monomers are not mutually exclusive, in that, the silicone-containing monomers can be somewhat hydrophilic and the hydrophilic monomers can comprise some silicone, because the silicone-containing monomers can have hydrophilic groups and the hydrophilic monomers can have silicone groups. Further, the silicone-containing monomer and hydrophilic monomers can be reacted prior to polymerization to form a prepolymer which is later polymerized in the presence of the diluent to form the polymer of this invention; however, the formation of the prepolymer can be complicated, and therefore is not preferred. It is preferred to polymerize at least one silicone-containing monomer and at least one hydrophilic monomer in the presence of the diluent monomer, wherein the silicone-containing monomers and the hydrophilic monomers differ. The term "monomer" used herein refers to low molecular weight compounds (i.e. typically having number average molecular weights less than 700) that can be polymerized, and to medium to high molecular weight compounds or polymers, sometimes referred to as macromonomers, (i.e. typically having number average molecular weights greater than 700) containing functional groups capable of further polymerization. Thus, it is understood that the terms "silicone-containing monomers" and "hydrophilic monomers" include monomers, macromonomers and prepolymers.

A silicone-containing monomer is one that contains at least one [—Si—O—] group, in a monomer, macromer or prepolymer. Preferably, the Si and attached O are present in the silicone-containing monomer in an amount greater than 20 weight percent, and more preferably greater than 30 weight percent of the total molecular weight of the silicone-containing monomer. Useful silicone-containing monomers preferably comprise polymerizable functional groups such as acrylate, methacrylate, acrylamide, methacrylamide, N-vinyl lactam, and styryl functional groups. Examples of silicone-containing monomers which are useful in this invention may be found in U.S. Pat. Nos. 4,136,250; 4,153,641; 4,740,533; 5,034,461 and 5,070,215, which are incorporated herein by reference. These references disclose many examples of olefincic silicone-containing monomers.

Further examples of suitable silicone-containing monomers are polysiloxanylalkyl (meth)acrylic monomers represented by the following formula:

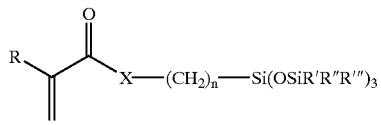

wherein: X denotes O or NR; each R independently denotes hydrogen or methyl, each R' independently denotes a lower alkyl radical or a phenyl radical, and n is 1 or 3 to 10.

Examples of these polysiloxanylalkyl (meth)acrylic monomers include methacryloxypropyl tris(trimethylsiloxy) silane, pentamethyldisiloxanyl methylmethacrylate, phenyltetramethyl-disiloxanylethyl acrylate, and methyldi (trimethylsiloxy)methacryloxymethyl silane. Methacryloxypropyl tris(trimethylsiloxy)silane is the most preferred.

One preferred class of silicone-containing monomers is a poly(organosiloxane) prepolymer represented by formula:

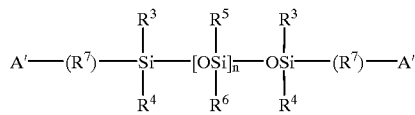

wherein: each A' independently denotes an activated unsaturated group, such as an ester or amide of an acrylic or a methacrylic acid; each of $R^3$, $R^4$, $R^5$ and $R^6$ are indepen dently selected from the group consisting of a monovalent hydrocarbon radical or a halogen substituted monovalent hydrocarbon radical having 1 to 18 carbon atoms which may have ether linkages between carbon atoms;

$R^7$ denotes a divalent hydrocarbon radical having from 1 to 22 carbon atoms, and n is 0 or an integer greater than or equal to 1, and preferably 5 to 400, and more preferably 10 to 300. One specific example is α,ω-bismethacryloxypropyl polydimethylsiloxane.

Another useful class of silicone containing monomers includes silicone-containing vinyl carbonate or vinyl carbamate monomers of the following formula:

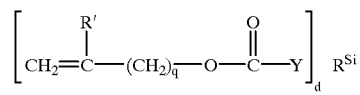

wherein: Y denotes O, S or NH; $R^{Si}$ denotes a silicone-containing organic radical; R' denotes hydrogen or methyl; d is 1, 2, 3 or 4; and q is 0 or 1.

Suitable silicone-containing organic radicals $R^{Si}$ include the following:

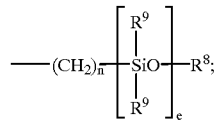

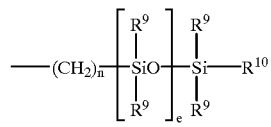

wherein: $R^{10}$ denotes

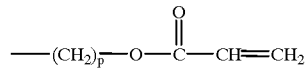

Wherein p is 1 to 6; $R^9$ denotes an alkyl radical or a fluoroalkyl radical having 1 to 6 carbon atoms; e is 1 to 200; n is 1,2,3 or 4; and m is 0, 1,2,3,4 or 5.

The silicone-containing vinyl carbonate or vinyl carbamate monomers specifically include: 1,3-bis[4-vinyloxycarbonyloxy)but-1-yl]tetramethyl-disiloxane 3-(trimethylsilyl) propyl vinyl carbonate; 3-(vinyloxycarbonylthio)propyl-[tris (trimethylsiloxysilane]; 3-[tris(trimethylsiloxy)silyl] propyl vinyl carbamate; 3-[tris(trimethylsiloxy)silyl] propyl allyl carbamate; 3-[tris(trimethylsiloxy)silyl] propyl vinyl carbonate, t-butyldimethylsiloxyethyl vinyl carbonate; trimethylsilylethyl vinyl carbonate; trimethylsilylmethyl vinyl carbonate, and

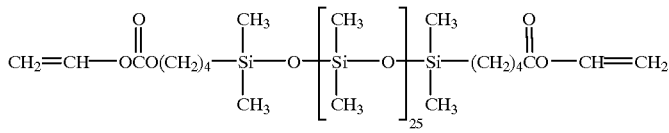

Another class of silicone-containing monomers includes monomers of the following formulae:

(*D*A*D*G)$_a$*D*D*E';

E(*D*G*D*A)$_a$*D*G*D*E' or;

E(*D*A*D*G)$_a$*D*A*D*E"

wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A denotes a divalent polymeric radical of formula:

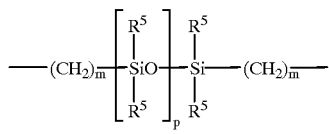

$R^5$ independently denotes an alkyl or fluoro-substituted alkyl group having 1 to 10 carbon atoms which may contain ether linkages between carbon atoms; m is at least 1; and p provides a moiety weight of 400 to 10,000; each of E and E' independently denotes a polymerizable unsaturated organic radical represented by formula:

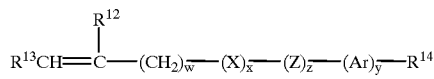

wherein: $R^{12}$ is hydrogen or methyl; $R^{13}$ is hydrogen, an alkyl radical having 1 to 6 carbon atoms, or a —CO—Y—$R^{15}$ radical wherein Y is —O—, —S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing monomer is represented by the following formula:

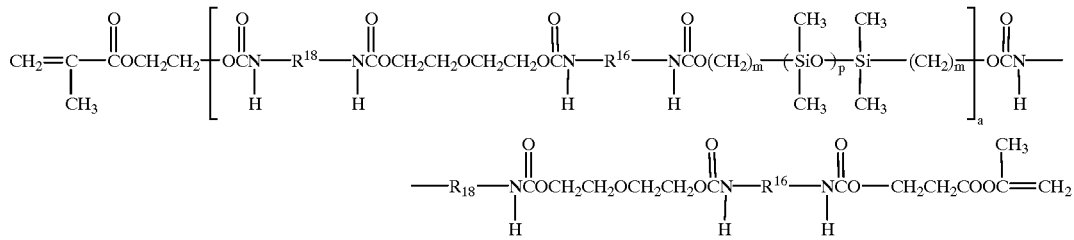

wherein $R^{16}$ is a diradical of a diisocyanate after removal of the isocyanate group, such as the diradical of isophorone diisocyanate.

Other silicone-containing monomers suitable for use in this invention include those described in WO 96/31792 such as macromers containing polysiloxane, polyalkylene ether, diisocyanate, polyfluorinated hydrocarbon, polyfluorinated ether and polysaccharide groups. U.S. Pat. Nos. 5,321,108; 5,387,662 and 5,539,016 describe polysiloxanes with a polar fluorinated graft or side group having a hydrogen atom attached to a terminal difluoro-substituted carbon atom. Such polysiloxanes can also be used as the silicone monomer in this invention.

The preferred hydrophilic monomers used to make the polymer of this invention may be either acrylic- or vinyl-containing. Such hydrophilic monomers may themselves be used as crosslinking agents. The term "vinyl-type" or "vinyl-containing" monomers refer to monomers containing the vinyl grouping (—CH═CH$_2$) and are generally highly reactive. Such hydrophilic vinyl-containing monomers are known to polymerize relatively easily. "Acrylic-type" or "acrylic-containing" monomers are those monomers containing the acrylic group:

(CH$_2$═CRCOX)

wherein R is H or CH3, and X is O or N, which are also known to polymerize readily, such as N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

Hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art.

More preferred hydrophilic monomers which may be incorporated into the polymer of the present invention include hydrophilic monomers such as N,N-dimethyl acrylamide (DMA), 2-hydroxyethyl methacrylate (HEMA), glycerol methacrylate, 2-hydroxyethyl methacrylamide, N-vinylpyrrolidone (NVP), polyethyleneglycol monomethacrylate, methacrylic acid and acrylic acid with DMA being the most preferred.

The most preferred hydrophilic monomers are selected from the group consisting of DMA, HEMA and NVP.

It is generally necessary to add one or more cross-linking agents, also referred to as cross-linking monomers, to the reaction mixture, such as ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other polyacrylate and polymethacrylate esters, such as the end-capped polyoxyethylene polyols described above containing two or more terminal methacrylate moieties. Cyclic polyols with polyalkylether segments and curable segments can also be used. For example, the cyclic polyols can consist of alkoxylated glucose or sucrose which are then reacted with an isocyanate, methacrylic acid or or a methacrylating agent to produce an ultraviolet curable prepolymer. Further description of these cyclic polyols can be found in U.S. Pat. No. 5,304,584, which is incorporated herein by reference. The cross-linking agents are used in the usual amounts, e.g., from about 0.000415 to about 0.0156 mole per 100 grams of reactive components in the reaction mixture. (The reactive components are everything in the reaction mixture except the diluent and any additional processing aids which do not become part of the structure of the polymer.) Alternatively, if the hydrophilic monomers and/or the silicone-containing monomers act as the cross-linking agent, the addition of a crosslinking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone-containing monomer which can act as a crosslinking agent and, when present, does not require the addition of a crosslinking monomer to the reaction mixture includes α,ω-bismethacryloxypropyl polydimethylsiloxane.

Other monomers that can be present in the reaction mixture include ultra-violet absorbing monomers, reactive tints and the like. Additional processing aids such as release agents or wetting agents can also be added to the reaction mixture.

A polymerization catalyst is preferably included in the reaction mixture. The polymerization catalyst can be a compound such as lauroyl peroxide, benzoyl peroxide, isopropyl percarbonate, azobisisobutyronitrile, or the like, that generates free radicals at moderately elevated temperatures, or the polymerization catalyst can be a photoinitiator system such as an aromatic alpha-hydroxy ketone or a tertiary amine plus a diketone. Illustrative examples of photoinitiator systems are 2-hydroxy-2-methyl-1-phenyl-propan-1-one, and a combination of camphorquinone and ethyl 4-(N,N-dimethylamino)benzoate. The catalyst is used in the reaction mixture in catalytically effective amounts, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. The preferred initiator is 2-hydroxy-2-methyl-1-phenyl-propan-1-one, and the preferred method of polymerization initiation is UV light.

The preferred range of silicone-containing monomer present in the reaction mixture is from about 5 to 95 weight percent, more preferably about 30 to 85 weight percent, and most preferably about 50 to 80 weight percent of the reactive components in the reaction mixture, The preferred range of hydrophilic monomer present in the above invention is from about 5 to 80 weight percent, more preferably about 10 to 60 weight percent, and most preferably about 20 to 50 weight percent of the reactive components in the reaction mixture. The preferred range of diluent present in the above invention is from about 2 to 70 weight percent, more preferably about 5 to 50 weight percent, and most preferably about 15 to 40 weight percent of the total reaction mixture. The amount of diluent required varies depending on the nature and relative amounts of the reactive components, but the amounts of the claimed diluents are generally substantially less than the amounts required if using prior art diluents. For example, mixtures containing relatively large amounts of the hydrophilic monomer, that is greater than 20%, or 25% or especially greater than 30% of the reaction mixture, and/or high molecular weight silicone-containing monomers (such as those having a number average molecular weight greater than 2000 or 3000 or especially greater than 5000) generally require relatively high levels of diluent, but much less using one or more of the diluents described herein as compared to the diluents used in the prior art.

Preferred combinations of reactive components and diluents are those having 10 to 50 weight percent of the reactive components being poly(organosiloxane) prepolymer, more preferably α,ω-bismethacryloxypropyl polydimethylsiloxane, 25 to 50 weight percent of the reactive components being a polysiloxanylalkyl (meth)acrylate, more preferably TRIS, 20 to 50 weight percent of the reactive components being a hydrophilic monomer, more preferably DMA, and a UV or visible light-active photoinitator, blended with a secondary or tertiary alcohol diluent, more preferably a tertiary alcohol, present in an amount of 15 to 40 percent of the total reaction mixture.

The reaction mixtures of the present invention can be formed by any of the methods known to those skilled in the art, such as shaking or stirring, and used to form polymeric articles or devices by the methods described earlier.

The Examples below further describe this invention. Some of the materials that are employed in the Examples are identified as follows:

"DAROCULRE 1173" 2-hydroxy-2-methyl-1-phenyl-propan-1-one,
"DMA" N,N-dimethylacrylamide,
"PDMS" α,ω-bismethacryloxypropyl polydimethylsiloxane, and
"TRIS" tris(trimethylsiloxy)silylpropyl methacrylate.

EXAMPLE 1

A blend was made of 36.5% PDMS (5000 MW), 27.5% TRIS, 35% DMA and 1% DAROCUR 1173, (all the preceding percents are weight percents of the reactive components) and diluted with tert-butanol to a reactive component/diluent weight ratio of 73/27. The resulting blend was a clear, homogeneous solution. Polypropylene contact lens molds were filled, closed and irradiated with a total of 3.2 J/cm$^2$ UV light from a fluorescent UV source over a 30-minute period. The molds were opened and the lenses were released into isopropanol and then transferred into deionized water.

The lenses were clear and had a tensile modulus of 99 (±5) g/mm$^2$, an elongation at break of 143 (±44) %, and an equilibrium water content of 30.6 (±0.3) %. Tensile properties were determined using an Instron™ model 1122 tensile tester. Equilibrium Water Contents (EWC) were determined gravimetrically and are expressed as:

% EWC=100×(mass of hydrated lens−mass of dry lens)/mass of hydrated lens

EXAMPLE 2

Blends and lenses were made using the procedure of EXAMPLE 1, but substituting 3-methyl-3-pentanol for tert-butanol at a reactive components/diluent ratio of 77/23. The blends and lenses were clear. The lenses had a tensile modulus of 111 (±3) g/mm$^2$, an elongation at break of 163 (±35) %, and an equilibrium water content of 30.0 (±0.1) %.

EXAMPLES 3–10

Blends were made using the formulation of EXAMPLE 1, but with the diluents and reactive components/diluent ratios listed in TABLE 1. All blends were clear.

COMPARATIVE EXAMPLE 1

A blend of was made using the formulation of EXAMPLE 1, but with 1-hexanol as the diluent. The blend was opaque, and remained opaque when diluted in a reactive components/diluent ratio of up to 38/62.

TABLE 1

Minimal amounts of diluents needed to produce clear blends

| Example | Diluent | Reactive Components/Diluent Ratio | Clarity of Blend |
|---|---|---|---|
| 1 | Tert-butanol | 76/24 | Clear |
| 2 | 3-methyl-3-pentanol | 77/23 | Clear |
| 3 | tert-amyl alcohol | 77/23 | Clear |
| 4 | 2-butanol | 72/28 | Clear |
| 5 | 2-methyl-2-pentanol | 72/28 | Clear |
| 6 | 2,3-dimethyl-2-butanol | 75/25 | Clear |
| 7 | 3,7-dimethyl-3-octanol | 77/23 | Clear |
| 8 | 1-methylcyclohexanol | 56/44 | Clear |
| 9 | 2-methyl-2-hexanol | 76/24 | Clear |
| 10 | 3-ethyl-3-pentanol | 77/23 | Clear |
| Comparative 1 | 1-hexanol | 38/62 | Opaque |

EXAMPLE 11

Lenses were made from a blend of 49.0% PDMS (5000 MW), 20.0% TRIS, 30.0% DMA and 1.0% DAROCUR 1173, using the process of EXAMPLE 1 and diluting with tert-butanol to a reactive components/diluent weight ratio of 60/40. The blend was clear. Lenses were made as described in EXAMPLE 1. The lenses were clear and had a tensile modulus of 137 (±11) g/mm$^2$, an elongation at break of 141 (±46) %, and an equilibrium water content of 26.1 (±0.2) %.

COMPARATIVE EXAMPLE 2

Blends were made from the formulation of EXAMPLE 11, but diluting with isopropanol to a reactive components/diluent weight ratio of 60/40. The blend was clear. Lenses were made as described in EXAMPLE 1. The lenses produced were clear and had a tensile modulus of 94 (±5) g/mm$^2$, an elongation at break of 147 (±76) %, and an equilibrium water content of 26.8 (±0.3) %.

The difference in moduli between Comparative Example 2 and Example 11 illustrates the improvement in mechanical properties achieved by using the claimed diluents.

EXAMPLES 12–16 and COMPARATIVE EXAMPLES 3–7

Blends having various amounts of PDMS (5000 MW), TRIS, DMA and DAROCUR 1173 were made, adding a minimal amount of diluent to produce a clear blend with either 3-ethyl-3-pentanol (Examples 12–16) or 1-hexanol (Comparative Examples 3–4). The results are listed in Table 2 which show that as the level of DMA in the blends increased, the diluents of this invention can be used in much lower levels to produce clear blends, as compared to the amount of the prior art diluent needed to produce clear blends.

TABLE 2

Comparison of minimal amounts of 3-methyl-3-pentanol and 1-hexanol needed to make clear blends

| Example | PDMS, grams (g) | TRIS, grams | DMA, grams | DAROCUR, grams | 3-Methyl-3-pentanol, g | 1-hexanol, grams |
|---|---|---|---|---|---|---|
| 12 | 2.2 | 1.75 | 1.00 | 0.05 | 0.60 | |
| Comp. 3 | 2.2 | 1.75 | 1.00 | 0.05 | | 0.60 |
| 13 | 2.08 | 1.63 | 1.25 | 0.05 | 0.76 | |
| Comp. 4 | 2.08 | 1.63 | 1.25 | 0.05 | | 1.08 |
| 14 | 1.95 | 1.50 | 1.50 | 0.05 | 1.07 | |
| Comp. 5 | 1.95 | 1.50 | 1.50 | 0.05 | | 3.75 |
| 15 | 1.83 | 1.38 | 1.75 | 0.05 | 1.52 | |
| Comp. 6 | 1.83 | 1.38 | 1.75 | 0.05 | | 8.08 |
| 16 | 1.70 | 1.25 | 2.00 | 0.05 | 2.01 | |
| Comp. 7 | 1.70 | 1.25 | 2.00 | 0.05 | | 13.43 |

The examples show that the polymers of this invention can be formed from reaction mixtures which contain significantly less diluent when using the diluents disclosed herein as compared to prior art diluents. As the results listed in Table 2 indicate, this becomes particularly important as the amount of the hydrophilic monomer in the reaction mixture increases. The amount of diluent needed to form a clear blend in Example 14 was 2.01 g of 3-methyl-3-pentanol, as compared to Comparative Example 7 which required 13.43 g of 1-hexanol for the same reactive components. Those examples indicate that it took more than 6 times more 1-hexanol to form the clear blend than 3-methyl-3-pentanol. Using the diluents disclosed herein it will now be possible and practical to form blends and lenses using mixtures of silicone-containing monomers and hydrophilic monomers that would not form clear blends or lenses using the prior art diluents. Further, the examples indicate that the polymers of this invention when used to from lenses possess good mechanical properties.

This invention has been described with reference to preferred embodiments; however, additional embodiments are within the skill of a person of ordinary skill in the art and are within the scope of this invention.

We claim:

1. A reaction mixture comprising one or more olefinic silicone-containing monomers, one or more hydrophilic monomers, and a diluent comprising the following structure:

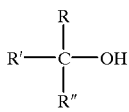

where R, R' and R" are independently selected from H, or unsubstituted, linear, branched or cyclic monovalent alkyl groups having 1 to 7 carbons with the proviso that no more than one of R, R' or R" is H; and wherein said hydrophilic monomer is selected from the group consisting of N,N-dimiethyl acrylamide (DMA), 2-hydroxyethyl methacrylate (HEMA), glycerol methylacrylate, 2-hydroxyethyl methacrylamide, polyethyleneglycol, monomethacrylate, methacrylic acid, acrylic acid, N-vinyl prrolidone (NVP), N-vinyl-N-methyl acetamide, N-viny-N-ethyl acetamide, N-vinyl-N-methyl acctamide, N-vinyl-N-ethyl fomiamide and N-vinyl formamide; said reaction mixture to be used to form a contact lens.

2. The reaction mixture of claim 1 wherein R, R', and R" are independently selected from unsubstituted linear, branched or cyclic alkyl groups having 1 to 7 carbons.

3. The reaction mixture of claim 1 wherein said structure of said diluent has 4 or more total carbons.

4. The reaction mixture of claim 1 wherein said structure of said diluent has 5 or more total carbons.

5. The reaction mixture of claim 1 wherein said diluent comprises a secondary alcohol.

6. The reaction mixture of claim 1 wherein said diluent comprises a tertiary alcohol.

7. The reaction mixture of claim 1 wherein said diluent is selected from the group consisting of 2-butanol, 2-propanol, menthol, cyclohexanol, cyclopentanol and exo-norbooreol, 2-pentanol, 3-pentanol, 2-hexanol, 3-hexanol, 3-methyl-2-butanol, 2-heptanol, 2-octanol, 2-nonanol, 2-decanol, 3-octanol, norborneol, and menthol.

8. The reaction mixture of claim 1 wherein said diluent is selected from the group consisting of tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-ethyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol.

9. The reaction mixture of claim 1 wherein said diluent is selected from the group consisting of tert-butanol, tert-amyl alcohol, 2-butanol, 2-methyl-2-pentanol, 2,3-dimethyl-2-butanol, 3-methyl-3-pentanol, 3-ethyl-3-pentanol, and 3,7-dimethyl-3-octanol.

10. The reaction mixture of claim 1 wherein said diluent is selected from the group consisting of tert-butanol, 3-methyl-3-pentanol and 3,7-dimethyl-3-octanol.

11. The reaction mixture of claim 1 wherein said silicone-containing monomer has Si and attached O present in an amount greater than 20 weight percent of the total molecular weight of said silicone-containing monomer.

12. The reaction mixture of claim 1 wherein said silicone-containing monomer has Si and attached O present in an amount greater than 30 weight percent of the total molecular weight of said silicone-containing monomer.

13. The reaction mixture of claim 1 wherein said silicone-containing monomers comprise polymerizable functional groups selected from the group consisting of acrylate, methacrylate, acrylamide, methacrylamide, N-vinyl lactam, and styryl functional groups.

14. The reaction mixture of claim 1 wherein said silicone-containing monomers are selected from the group consisting of methacryloxypropyl tris(trismethylsiloxy) silane and α,ω-bismethacryloxypropyl polydimethylsiloxane.

15. The reaction mixture of claim 1 wherein said hydrophilic monomers are selected from the group consisting of N,N-dimethyl acrylamide (DMA) and N-vinyl pyrrolidone (NVP).

16. The reaction mixture of claim 1 further comprising a crosslinking agent.

17. The reaction mixture of claim 16 wherein said crosslinking agent is selected from the group consisting of ethylene glycol dimethacrylate, trimethylolpropane trimethacrylate, and glycerol trimethacrylate, polyethylene glycol dimentacrylate, polyacrylate ester, and polymethacrylate ester, end-capped polyoxyethylene polyoxylethylene polyols containing two or more terminal methacrylate moieties and alkoxylated glucose or sucrose which is reacted with an isocyanate, methacrylic acid or a methacrylating agent.

18. The reaction mixture of claim 1 further comprising a catalyst.

19. The reaction mixture of claim 18 wherein said catalyst is selected from the group consisting of lauroyl peroxide, benzoyl peroxide, isopropyl percarbonate, azobisisobutyronitrile, 2-hydroxy-2-metnyl-1-phyenyl-propan-1-one, and a combination of camphorquinone and ethyl 4-(N,N-dimethylamino)benzoate.

20. The reaction mixture of claim 1 wherein said silicone-containing monomer is selected from the group consisting of tris(trimethylsiloxy)silylpropyl methacrylate and α,ω-bismethacryloxypropyl polydimethylsiloxane, and wherein said hydrophilic monomer comprises N,N-dimethylacrylamide, and said diluent is a tertiary alcohol.

21. The reaction mixture of claim 1 wherein said silicone-containing monomer comprises 10 to 90 weight percent of the polymerizable components, and wherein said hydrophilic monomer comprises 5 to 60 weight percent of the polymerizable components, and said diluent comprises 1 to 40 weight percent of the combined weight of polymerizable components and diluent.

22. The reaction mixture of claim 1 wherein said silicone-containing monomer comprises 30 to 80 weight percent of the polymerizable components, and wherein said hydrophilic monomer comprises 10 to 40 weight percent of the polymerizable components, and said diluent comprises 3 to 30 weight percent of the combined weight of polymerizable components and diluent weight.

23. The reaction mixture of claim 1 wherein said silicone-containing monomer has Si and attached O present in an amount greater than 20 weight percent of the total molecular weight of said silicone-containing monomer.

24. The reaction mixture of claim 1 wherein said silicone-containing monomer has Si and attached O present in an amount greater than 20 weight percent of the total molecular weight of said silicone-containing monomer.

25. The reaction mixture of claim 1 wherein said silicone-containing monomer has Si and attached O present in an amount greater than 30 weight percent of the total molecular weight of said silicone-containing monomer.

* * * * *